US009882333B2

(12) United States Patent
Lee et al.

(10) Patent No.: US 9,882,333 B2
(45) Date of Patent: Jan. 30, 2018

(54) GRIPPING AND ASSEMBLING DEVICE FOR FLEXIBLE OBJECT

(71) Applicant: Daegu Gyeongbuk Institute of Science and Technology, Daegu (KR)

(72) Inventors: Sang-Mun Lee, Daegu (KR); Jinung An, Daegu (KR); Dae-han Hong, Daegu (KR); Jeong Hwan Kwak, Daegu (KR); Jung-Hyun Choi, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 73 days.

(21) Appl. No.: 15/050,465

(22) Filed: Feb. 23, 2016

(65) Prior Publication Data

US 2016/0297075 A1 Oct. 13, 2016

(30) Foreign Application Priority Data

Apr. 13, 2015 (KR) ........................ 10-2015-0051736

(51) Int. Cl.
*B25J 9/02* (2006.01)
*H01R 43/26* (2006.01)

(52) U.S. Cl.
CPC .................................... *H01R 43/26* (2013.01)

(58) Field of Classification Search
CPC .... H01R 43/26; H01R 13/629; H01R 43/048; H01R 43/0486; H01R 43/0488; H01R 2201/00; H01R 12/77; H01R 12/70; G21F 7/06; B25J 1/10; B25J 1/02; B25J 5/00; B25J 7/00; B25J 9/00; B25J 9/02–9/023; B25J 9/12–9/126; B25J 15/00; B25J 15/0014–15/0028; B25J 19/02
See application file for complete search history.

(56) References Cited

U.S. PATENT DOCUMENTS 9,004,560 B2 * 4/2015 Umeno ................ B25J 15/0033 294/119.1
9,604,329 B2 * 3/2017 Ono ........................ B23P 19/06

FOREIGN PATENT DOCUMENTS

JP 07308881 A * 11/1995
KR 10-2014-0055277 A 5/2014

OTHER PUBLICATIONS

English translation of JP 07-308881.*

* cited by examiner

*Primary Examiner* — Jun Yoo
(74) *Attorney, Agent, or Firm* — Revolution IP, PLLC

(57) ABSTRACT

An apparatus for an assembly process, where in a flexible object is moved by a manipulator to be engaged with a connector, including: a body provided in the manipulator and moved toward the connector; a driving part provided inside of the body; a moving part provided under the body and moved up and down by the driving part to press and grip a flexible object; and a fixing part with one end provided under the body, the other end positioned under the moving part, and a top surface including a support plate to be mounted with the flexible object.

4 Claims, 6 Drawing Sheets

GRIPPING AND ASSEMBLING DEVICE FOR FLEXIBLE OBJECT

RELATED APPLICATION

This application claims the benefit of Korean Patent Application No. 10-2015-0051736, filed on Apr. 13, 2015, in the Korean Intellectual Property Office, the disclosure of which is incorporated herein in its entirety by reference.

BACKGROUND

1. Field

The present invention relates to an apparatus for an assembly process, and more particularly, to an apparatus for an assembly process for gripping a flexible object such as a connector cable to automatically engage the connector cable with a connector.

2. Description of the Related Art

Generally, end-effectors, which are mounted at an end of a manipulator included in a robot's arm and perform a specific operation by contacting an object, have been widely used in the field for service robots as well as the field for industrial robots.

In the field of such end-effectors, precise and skillful operations such as those done by a human's hand account for a greater part of operations at assembly of a TV Back panel, such as gripping a connector cable and engaging the connector cable with a connector. Thus, researches on a multi-degree-of-freedom (MDOF) robot arm simulating the human's hand are being carried out. However, application of an expensive robot arm to a simple and repetitive task is economically undesirable, and control of the MDOF robot arm is very complicated, there by making the application of the robot arm to industry fields difficult.

For this reason, an operation of gripping a connector cable and engaging the connector cable with a connector is generally performed by using simple industrial grippers in the industry fields. Since the currently used industrial grippers are mostly used to horizontally grip an object with a pincer-like shape, it is difficult for the grippers to grip a thin flexible object, and a space for placement of a workbench is very limited. In addition, since the gripper has a rigid body, it may be difficult to precisely control the position of the gripper and to control a gripping force thereof.

On the other hand, since the connector's position is different according to the assembly, the gripper cannot be combined with the connector if the connector is positioned inward from an edge of a board.

Background technology of the present invention is disclosed in Korean Patent Laid-Open Publication No. 10-2014-0055277 (laid-open on May 9, 2014).

SUMMARY

The present invention has been made in an effort to provide an apparatus for an assembly process with a high engagement success rate that is capable of precisely controlling the position of a flexible object and thus enabling a gripping force to be controlled in an operation of gripping a flexible object such as a connector cable and engaging the connector cable with a connector.

An apparatus for an assembly process according to the present invention, wherein a flexible object is moved by a manipulator to be engaged with a connector, includes: a body provided in the manipulator and moved toward the connector; a driving part provided inside of the body; a moving part provided under the body and moved up and down by the driving part to press and grip a flexible object; and a fixing part with one end provided under the body, the other end positioned under the moving part, and a top surface including a support plate to be mounted with the flexible object.

After the body is moved toward the connector such that the connector and the flexible object contact each other, movement of the fixing part may be limited by a board that is disposed at a lower end of the connector, and the moving part may press the flexible object in a direction toward the connector such that the flexible object is engaged with the connector.

The apparatus may further include a micro adjuster that is provided above the body and moves forward/backward, leftward/rightward, and rotates to give a degree of freedom to the flexible object.

Preferably, the micro adjuster may include: a rotation adjuster provided above the body and rotating based on a rotation shaft; a forward/backward adjuster provided above the rotation adjuster and moving forward and backward toward the connector; and a left/right adjuster provided above the forward/backward adjuster and moving leftward/rightward.

Preferably, the rotation adjuster, the forward/backward adjuster, and the left/right adjuster may include: a ball plunger; a moving body formed with a groove at a side facing the ball plunger; and one or more elastic members provided at a terminal end of the moving body and elastically supporting the moving body, and the moving body may move back to an original position by the elastic member and the ball plunger.

The apparatus may further include a fixing adjuster that is connected between the fixing part and the micro adjuster, moves the fixing part forward or backward toward the connector, and allows the elastic member to move the fixing part back to an original position.

Preferably, the fixing part may further include a force sensor module that adjusts a gripping force by detecting a force with which the flexible object is gripped by up and down movement of the moving part.

In accordance with the apparatus for an assembly process according to the present invention, the flexible object can be gripped between the moving part moving up and down and the fixing part that is fixed, thereby stably engaging the flexible object with the connector.

In addition, the engagement success rate can be increased by including a micro adjuster and a fixing adjuster to give a degree of freedom to the flexible object, and damage to the flexible object can be prevented by including the force sensor module.

DETAILED DESCRIPTION

Figure 1:
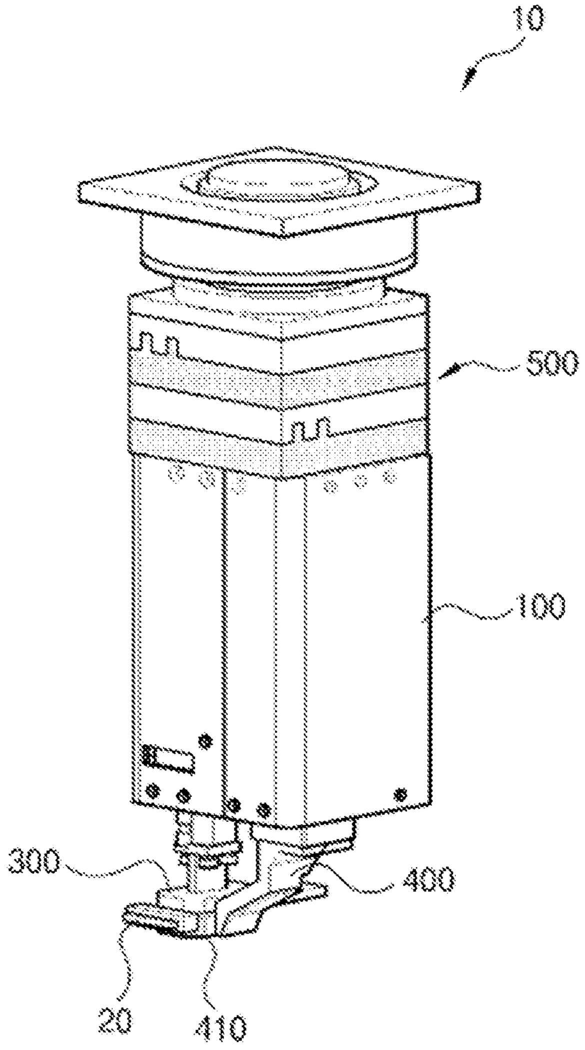
FIG. 1 is a perspective view of an apparatus for an assembly process according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

Throughout the specification, unless explicitly described to the contrary, the word “comprise” and variations such as “comprises” or “comprising” will be understood to imply the inclusion of stated elements but not the exclusion of any other elements.

The present invention will be described more fully hereinafter with reference to the accompanying drawings, in which exemplary embodiments of the invention are shown.

Figure 2:
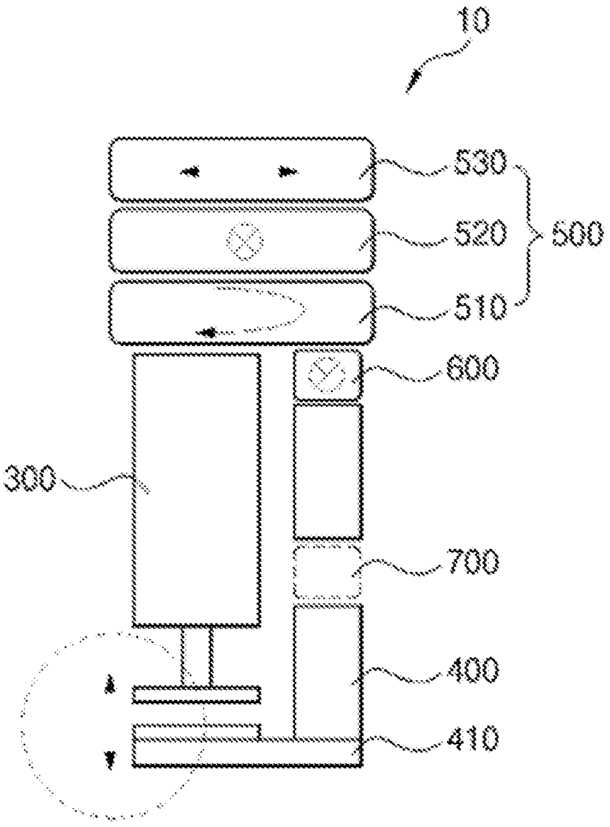
FIG. 2 is a schematic diagram of a front side of the apparatus for an assembly process illustrated in FIG. 1.
Figure 3:
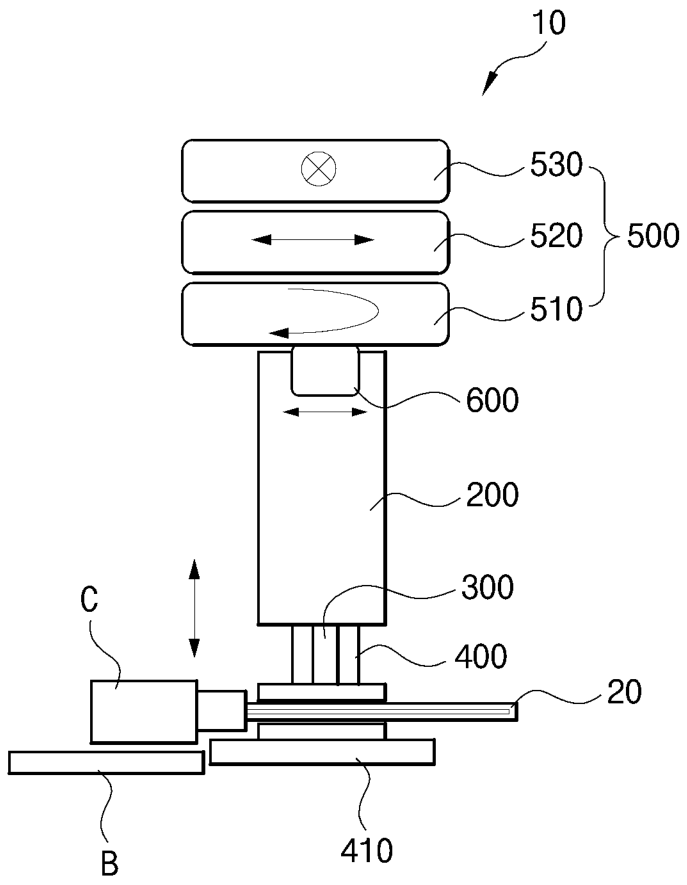
FIG. 3 is a schematic diagram of a lateral side of the apparatus for an assembly process illustrated in FIG. 1.

FIG. 1 is a perspective view of an apparatus for an assembly process according to an exemplary embodiment of the present invention, FIG. 2 is a schematic diagram of a front side of the apparatus for an assembly process illustrated in FIG. 1, and FIG. 3 is a schematic diagram of a lateral side of the apparatus for an assembly process illustrated in FIG. 1

Referring to FIG. 1 to FIG. 3, the apparatus 10 for an assembly process according to the current exemplary embodiment of the present invention, wherein a flexible object 20 is moved by a manipulator to be engaged with a connector C, includes a body 100, a driving part 200, a moving part 300, and a fixing part 400. In this case, the flexible object 20 means a connector cable and the like as illustrated, but it is illustrative and can thus be applied to other cases. In addition, the connector C may be assembled on a PCB board mounted on a TV back panel or the like, but it is only illustrative, and it is not limited thereto.

First, the body 100 is moved toward the connector C by the manipulator. The body 100 should desirably be a hollow frame, and the driving part 200 to be described below may be provided inside the body 100.

The driving part 200 is provided inside the body 100. Though not illustrated in the drawing, the driving part 200 may be equipped with a motor for supplying driving torque. In addition, the driving part 200 may include a ball screw that rotates by the driving torque of the motor. Further, the driving part 200 may include a moving block that moves up and down by the ball screw.

The moving part 300 is provided under the body 100, and moves up and down by the driving part 200. That is, the moving part 300 is provided under the moving block, and moves up and down as the moving block moves up and down. Finally, the moving part 300 moves up and down to press and grip the flexible object 20. In this case, the ball screw is applied to the up and down movement of the moving part 300 to prevent backdriving from occurring. Accordingly, after gripping the flexible object 20, the moving part 300 is prevented from being separated by an external force from a position at which the flexible object 20 is gripped.

One end of the fixing part 400 is provided under the body 100, while the other end thereof is positioned under the moving part 300. In addition, a support plate 410 is provided at the other end of the fixing part 400.

In this case, the flexible object 20 is mounted on a top surface of the support plate 410. Once the flexible object 20 is mounted on the support plate 410, the moving part 300 vertically moves upward of the support plate 410. Accordingly, the flexible object 20 positioned on the support plate 410 is pressed and gripped by the moving part 300. That is, the flexible object 20 is positioned between the fixing part 400 and the moving part 300, and is gripped by the up and down movement of the moving part 300. A structure is provided in which the moving part 300 moves up and down relative to the fixing part 400 and a gripping position is easily selected by setting the fixing part 400 as a gripping reference point.

In addition, the fixing part 400 may further include a force sensor module 700 for controlling a gripping force by detecting a force with which the flexible object 20 is gripped by the up and down movement of the moving part 300. The force sensor module 700 measures and adjusts the gripping force when the flexible object 20 is gripped. The flexible object 20 may be properly gripped by means of the force sensor module 700 depending on the kind or form of the flexible object 20, thereby minimizing damage to the flexible object 20.

In addition, the moving part 300 and the fixing part 200 may be attached/detached to allow for different shapes for the proper gripping depending on working conditions or the kind and shape of the flexible object 20. The apparatus 10 for an assembly process may further include a micro adjuster 500 that is provided above the body 100.

The micro adjuster 500 moves forward/backward, leftward/rightward, and rotates to give a degree of freedom to the flexible object 20. In this case, the degree of freedom allows minute movement of the body 100, thereby implementing the same function as that performed by the human’s hand. That is, a force applied at engagement of the flexible object 20 along with inclusion of the micro adjuster 500 allows the apparatus 10 for an assembly process to minutely move. The micro adjuster 500 may allow a position of the flexible object 20 to be smoothly controlled when the flexible object 20 is engaged with the connector C, and increase an engagement success rate.

A configuration of the micro adjuster 500 according to the current exemplary embodiment of the present invention will now be described in more detail with reference to FIGS. 4A to 4C.

Figure 4A:
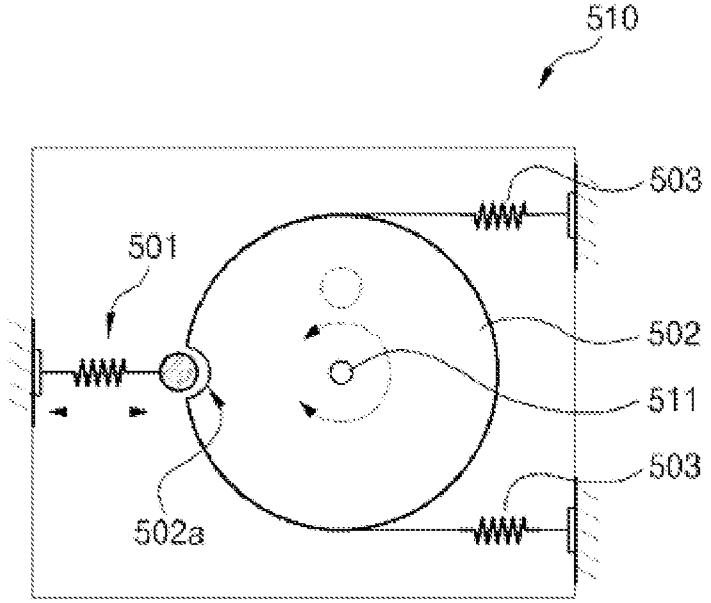
FIG. 4A is a top plan view of a rotation adjuster of the apparatus for an assembly process illustrated in FIG. 1.
Figure 4B:
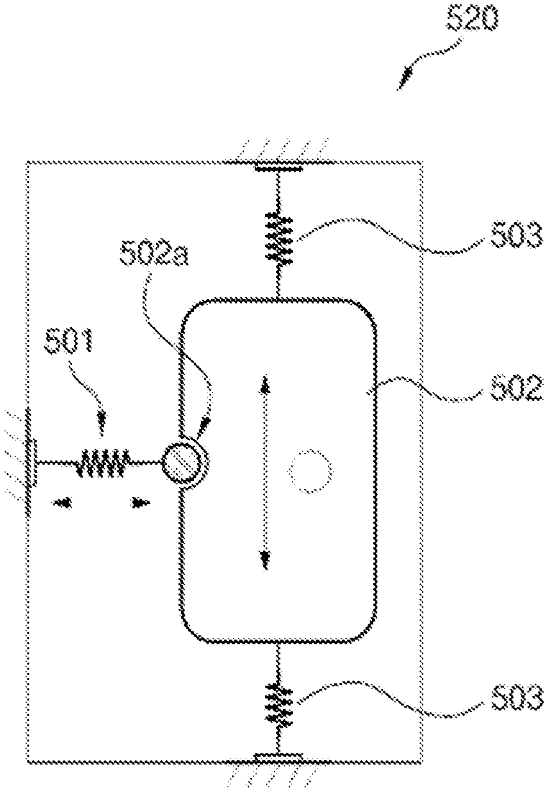
FIG. 4B is a top plan view of a forward/backward adjuster of the apparatus for an assembly process illustrated in FIG. 1.
Figure 4C:
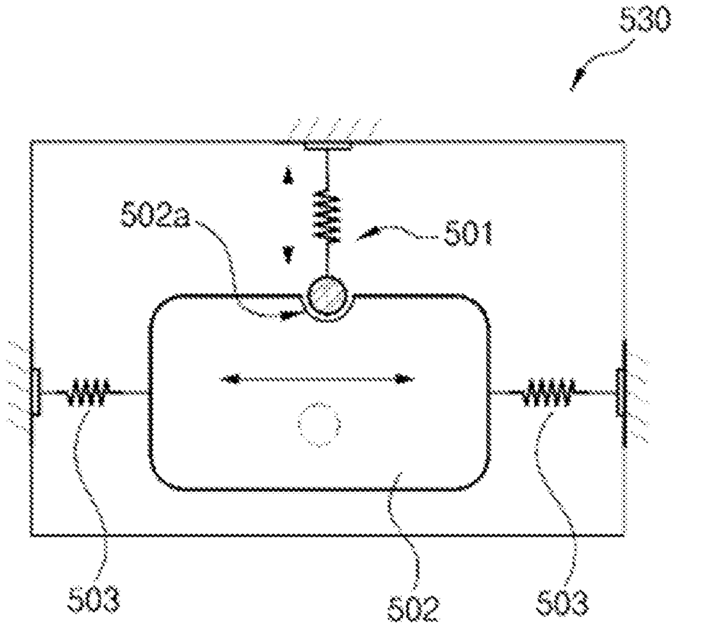
FIG. 4C is a top plan view of a left/right adjuster of the apparatus for an assembly process illustrated in FIG. 1.

FIG. 4A is a top plan view of a rotation adjuster of the apparatus for an assembly process illustrated in FIG. 1, FIG. 4B is a top plan view of a left/right adjuster of the apparatus for an assembly process illustrated in FIG. 1, and FIG. 4C is a top plan view of a forward/backward adjuster of the apparatus for an assembly process illustrated in FIG. 1.

The micro adjuster 500 should preferably include a rotation adjuster 510, a forward/backward adjuster 520, and a left/right adjuster 530.

Referring to FIG. 4A, the rotation adjuster 510 is provided above the body 100, and rotates based on a rotation shaft 511. As illustrated in FIG. 4B, the forward/backward adjuster 520 is provided above the rotation adjuster 510, and moves forward and backward toward the connector C. As illustrated in FIG. 4C, the left/right adjuster 530 is provided above forward/backward adjuster 520, and moves leftward/rightward.

That is, the rotation adjuster 510, the forward/backward adjuster 520, and the left/right adjuster 530 allow the apparatus 10 for an assembly process to rotate, move forward/backward, and move rightward/leftward according to the engagement of the flexible object 20. Accordingly, when it is impossible for the flexible object 20 to be engaged with the connector C due to rigidity of the device such as the manipulator, it is possible to make smooth movement for stable engagement. Further, minute movement is also possible to prevent a risk of damage to the connector C.

In this case, the rotation adjuster 510, the forward/backward adjuster 520, and the left/right adjuster 530 may include a ball plunger 501, a moving body 502, and an elastic member 503.

The ball plunger 501 includes a spring, and a ball is provided at a terminal end of the spring. A groove 502*a* is formed in the moving body 502 to face the ball of the ball plunger 501. One or more of the elastic members 503 are provided at a terminal end of the moving body 502 to elastically support the moving body 502. In this case, after rotating, moving forward/backward, and moving leftward/rightward, the moving body 502 may move back to an original position by the elastic member 503 and the ball plunger 501. When the apparatus 10 for an assembly process is used to engage the flexible object 20 with the connector C, minute movements such as those performed by a human hand is implemented, thereby increasing the engagement success rate.

Figure 5:
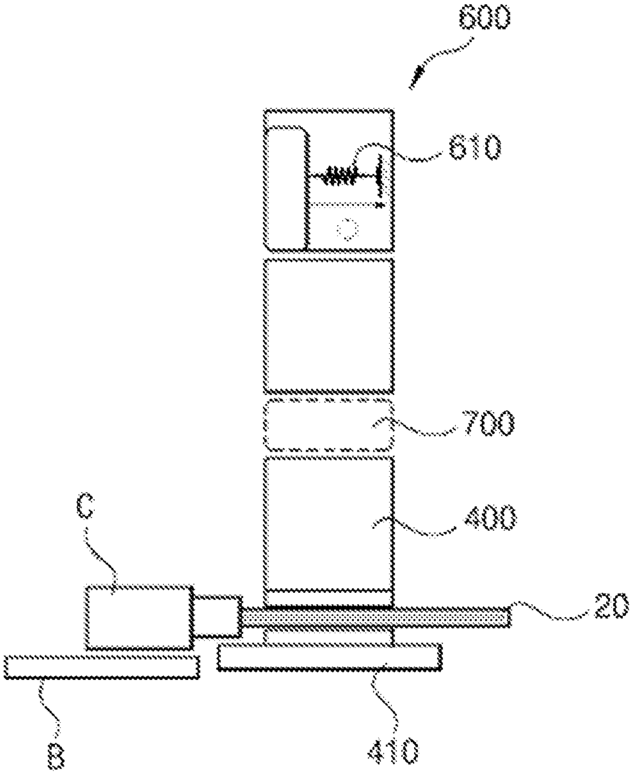
FIG. 5 is a side view of a fixing adjuster of the apparatus for an assembly process illustrated in FIG. 1.

FIG. 5 is a side view of a fixing adjuster of the apparatus for an assembly process illustrated in FIG. 1.

As shown in FIG. 5, the apparatus 10 for an assembly process may further include the fixing adjuster 600.

The fixing adjuster 600 is connected between the fixing part 400 and the micro adjuster 500, and moves forward and backward toward the connector C to be engaged with the fixing part 400, thereby giving a degree of freedom to the flexible object 20. In addition, the fixing part 400 may be moved back to the original position by the fixing adjuster 600. Similar to the micro adjuster 500, the fixing adjuster 600 is implemented to allow minute movements of the flexible object 20 such as those performed by the human's hand when the flexible object 20 is engaged with the connector C, thereby serving to increase the engagement success rate. In addition, the fixing adjuster 600 may be implemented such that it is movable to engage with the connector C even when the connector C is positioned to be separated by a predetermined distance inward from an edge of a board B such as a PCB.

An operating process of the apparatus 10 for an assembly process illustrated in FIG. 1 will be described in sequence with reference to FIGS. 6A to 6C. In the operating process illustrated below in sequence, a case in which the connector C is positioned to be separated by the predetermined distance inward from the edge of the board B such as the PCB is illustrated.

Figure 6A:
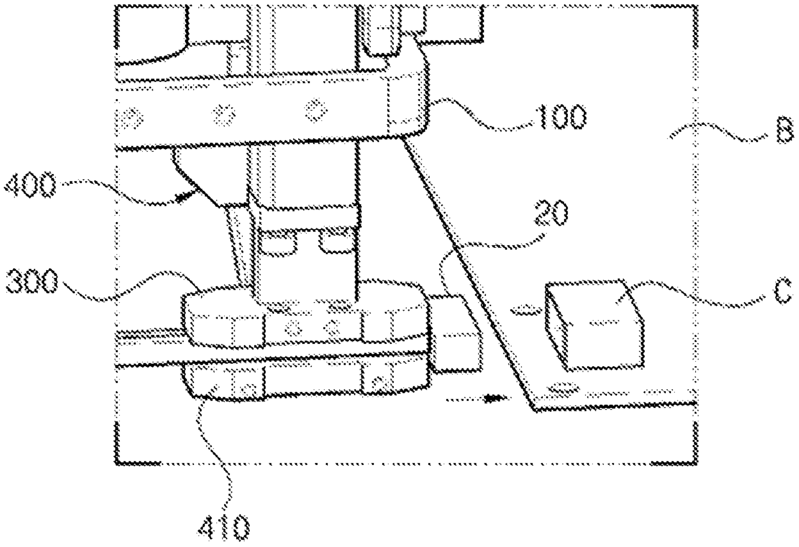
FIGS. 6A to 6C are perspective views sequentially illustrating operations performed by the apparatus for an assembly process illustrated in FIG. 1.
Figure 6B:
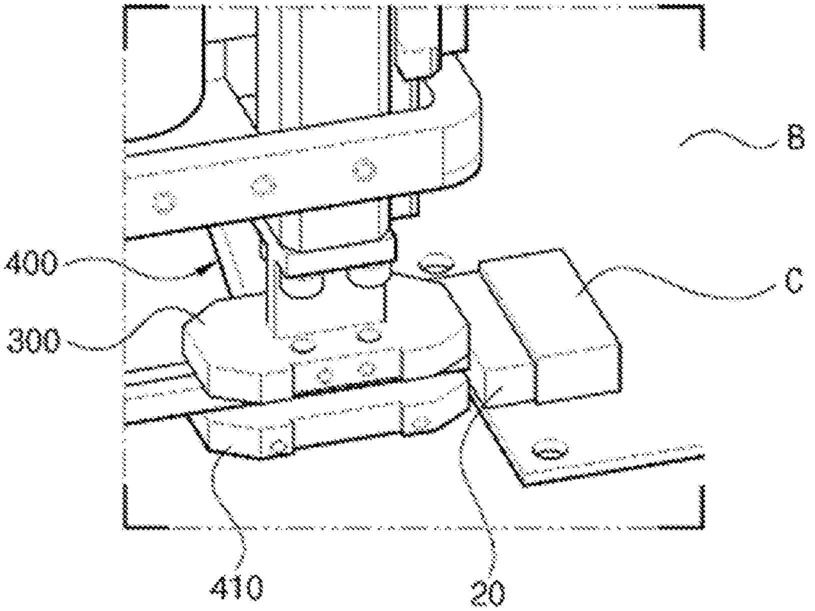
Figure 6C:
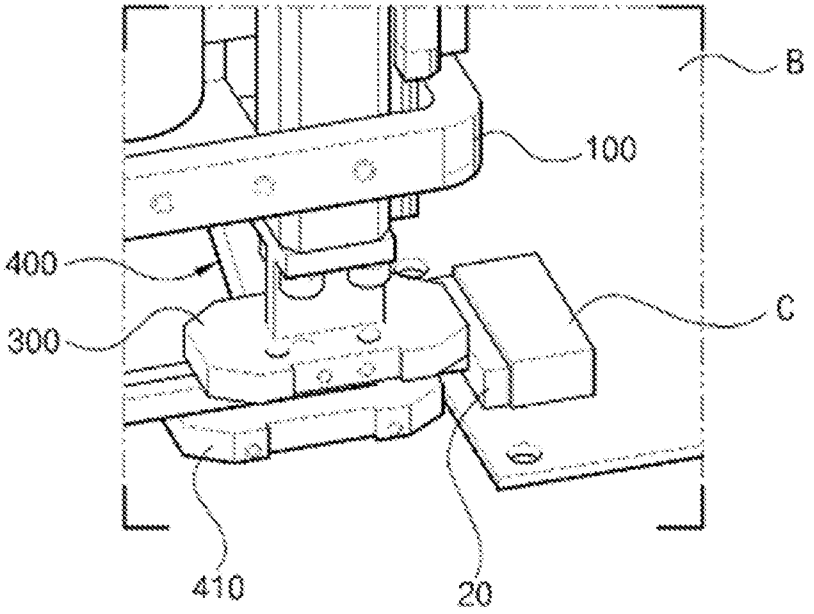

FIG. 6A is a perspective view of an operating state in which the flexible object is gripped and is then moved toward the connector, FIG. 6B is a perspective view of an operating state in which the fixing part contacts the board, and FIG. 6C is a perspective view of an operating state in which the moving part allows the flexible object to be engaged with the connector by pressing the flexible object.

First, as illustrated in FIG. 6A, the flexible object 20 is gripped by the moving part 300 and the fixing part 400, and is then moved toward the connector C to be engaged with the connector C.

Next, as illustrated in FIG. 6B, the fixing part 400 contacts the board B to which the connector C is combined, and the flexible object 20 contacts the connector C. Movement of the fixing part 400 is limited by the board B in a moving direction.

Finally, as illustrated in FIG. 6C, the movement of the fixing part 400 is limited by the board B in the moving direction, and the moving part 300 may continue to move toward the connector C such that it allows the flexible object 20 to engage with the connector C by pressing the flexible object 20.

According to the apparatus 10 for an assembly process according to the present invention as described above, the flexible object 20 can be gripped between the moving part 300 moving up and down and the fixing part 400 that is fixed, thereby stably engaging the flexible object 20 with the connector C.

In addition, the micro adjuster 500 and the fixing adjuster 600 can be included to give a degree of freedom to the flexible object 20 such that the engagement success rate is increased by precise position control, and the force sensor module 700 can be included to prevent damage to the flexible object 20.

As described above, in accordance with the apparatus for an assembly process according to the current exemplary embodiment of the present invention, the flexible object can be gripped between the moving part moving up and down and the fixing part that is fixed, thereby stably engaging the flexible object with the connector.

In addition, the engagement success rate can be increased by including a micro adjuster and a fixing adjuster to give a degree of freedom to the flexible object, and damage to the flexible object can be prevented by including the force sensor module.

As described above, the present invention has been described with reference to the exemplary embodiments that are illustrated in the drawings. However, it should be understood to the person skilled in the art that the exemplary embodiments are only illustrative, and various modifications and equivalent exemplary embodiments may be made from the exemplary embodiment. Therefore, the true protective scope of the present invention should be determined by the appended claims.

What is claimed is:

1. An apparatus for an assembly process, where in a flexible object is moved by a manipulator to be engaged with a connector, comprising:

a body provided in the manipulator and configured to move toward the connector;

a driving part provided inside of the body;

a moving part provided under the body and configured to move up and down by the driving part to press and grip a flexible object;

a fixing part with one end provided under the body, the other end positioned under the moving part, and a top surface including a support plate to be mounted with the flexible object; and a micro adjuster provided above the body, the micro adjuster configured to move forward/backward, leftward/rightward, and rotate to give a degree of freedom to the flexible object, wherein the micro adjuster includes a rotation adjuster provided above the body and configured to rotate based on a rotation shaft, a forward/backward adjuster provided above the rotation adjuster and configured to move forward and backward toward the connector, and a left/right adjuster provided above the forward/backward adjuster and configured to move leftward/rightward, wherein the rotation adjuster, the forward/backward adjuster, and the left/right adjuster include a ball plunger, a moving body formed with a groove at a side facing the ball plunger, and one or more elastic members provided at a terminal end of the moving body and configured to elastically support the moving body, wherein the moving body is configured to move back to an original position by the elastic members and the ball plunger.

2. The apparatus of claim 1, when the body moves toward the connector, the fixing part is configured to contact the board disposed at a lower end of the connector such that movement of the fixing part is limited by the board, and the moving part is configured to press the flexible object in a direction toward the connector such that the flexible object is engaged with the connector.

3. The apparatus of claim 1, further comprising a fixing adjuster connected between the fixing part and the micro adjuster, wherein the fixing adjuster is configured to move the fixing part forward or backward toward the connector.

4. The apparatus of claim 1, where in the fixing part further includes a force sensor module configured to detect and adjust a gripping force with which the flexible object is gripped by up and down movement of the moving part.

* * * * *